United States Patent
Behr

(10) Patent No.: US 7,447,813 B2
(45) Date of Patent: Nov. 4, 2008

(54) METHOD FOR IDENTIFYING INCOMPATIBILITIES IN A BUS SYSTEM COMPRISING SEVERAL CONTROL DEVICES

(75) Inventor: Matthias Behr, Allershausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/542,000

(22) Filed: Sep. 29, 2006

(65) Prior Publication Data

US 2007/0032917 A1 Feb. 8, 2007

Related U.S. Application Data

(63) Continuation of application No. PCT/EP2004/003589, filed on Apr. 1, 2004.

(51) Int. Cl.
G06F 13/12 (2006.01)

(52) U.S. Cl. .............................. 710/62; 710/72; 702/90; 717/120

(58) Field of Classification Search .................. 710/72, 710/10, 104, 62; 702/90; 717/120
See application file for complete search history.

(56) References Cited

U.S. PATENT DOCUMENTS

| | | | | |
|---|---|---|---|---|
| 4,135,240 A * | 1/1979 | Ritchie | ....................... | 711/164 |
| 5,214,774 A * | 5/1993 | Welsch et al. | .............. | 455/11.1 |
| 5,365,436 A * | 11/1994 | Schaller et al. | .............. | 701/33 |
| 5,570,002 A * | 10/1996 | Castleman | .................. | 323/283 |
| 5,579,509 A * | 11/1996 | Furtney et al. | ................ | 703/27 |
| 5,579,511 A * | 11/1996 | Cavasa et al. | ................. | 703/27 |
| 5,613,101 A * | 3/1997 | Lillich | ........................ | 709/230 |
| 5,850,573 A * | 12/1998 | Wada | .......................... | 710/62 |
| 5,954,797 A * | 9/1999 | Sidey | .......................... | 709/223 |
| 6,052,753 A * | 4/2000 | Doerenberg et al. | ........ | 710/305 |
| 6,185,484 B1 * | 2/2001 | Rhinehart | ...................... | 701/1 |
| 6,251,014 B1 * | 6/2001 | Stockdale et al. | ............. | 463/16 |
| 6,484,128 B1 * | 11/2002 | Sekiya et al. | ............... | 702/185 |
| 6,754,717 B1 * | 6/2004 | Day et al. | ................... | 709/248 |
| 6,892,256 B1 * | 5/2005 | Krishnankutty | ............. | 710/104 |
| 6,898,768 B1 * | 5/2005 | Theodossy et al. | ............. | 716/5 |
| 6,901,316 B1 * | 5/2005 | Jensen et al. | ................ | 700/286 |
| 6,956,490 B2 * | 10/2005 | Childers | ..................... | 340/641 |
| 7,071,972 B2 * | 7/2006 | Koyama | ................... | 348/211.3 |

(Continued)

OTHER PUBLICATIONS

Apple Computer, Inc. et al. Interoperability Specification for ICCs and Personal Computer Systems. Part 1. Revision 2.01.01. Sep. 2005.*

(Continued)

*Primary Examiner*—Mark Rinehart
*Assistant Examiner*—Matthew D Spittle
(74) *Attorney, Agent, or Firm*—Crowell & Moring LLP

(57) ABSTRACT

Control device identification information or an identifier identifying the type of the corresponding control device is stored in a first and in a second control device. Version information identifying the sequence control of the corresponding control device, such as a version number, is stored in the first and in the second control device. The first control device transmits its first control device identification information and/or its first version information to the second control device. The second control device accesses a compatibility reference table. The compatibility reference table indicates which combinations of control device identification information and version information, and thus which control devices and their corresponding sequence controls will communicate with the second control device in a compatible manner.

19 Claims, 2 Drawing Sheets

U.S. PATENT DOCUMENTS

| | | | | |
|---|---|---|---|---|
| 7,289,449 | B1* | 10/2007 | Rubinstein et al. | 370/245 |
| 2002/0184410 | A1* | 12/2002 | Apel et al. | 710/5 |
| 2003/0140134 | A1* | 7/2003 | Swanson et al. | 709/223 |
| 2003/0233493 | A1* | 12/2003 | Boldon et al. | 710/1 |
| 2005/0053091 | A1* | 3/2005 | Lee | 370/466 |
| 2006/0048141 | A1* | 3/2006 | Persson et al. | 717/176 |

OTHER PUBLICATIONS

Apple Computer, Inc. et al. Interoperability Specification for ICCs and Personal Computer Systems. Part 2. Revision 2.01.01. Sep. 2005.*

Schwenke, Martin. Towards a small, efficient Linux hardware inventory system. IBM OzLabs Linux Technology Center. 2005.*

Craig et al. Compatibility of Software Components—Modeling and Verification. Proceedings of the International Conference on Dependability of Computer Systems. IEEE. 2006.*

International Search Report dated Oct. 20, 2004, with Translation (Four (4) pages). And Forms PCT/IB/338 and ISA/237 dated Nov. 9, 2006 with Translation (Eighteen (18) pages).

* cited by examiner

METHOD FOR IDENTIFYING INCOMPATIBILITIES IN A BUS SYSTEM COMPRISING SEVERAL CONTROL DEVICES

CROSS REFERENCE TO RELATED APPLICATIONS

This application is a continuation of PCT International Application No. PCT/EP2004/003589, filed Apr. 1, 2004, the entire disclosure of which is herein expressly incorporated by reference.

BACKGROUND AND SUMMARY OF THE INVENTION

The invention relates to a method of identifying incompatibilities in a bus system of a motor vehicle having several control devices.

Incompatibilities may occur as a result of the installation of control devices of different development stages, particularly in the event of an unprofessional repair of the vehicle. Incompatibilities may impair the operability of the vehicle. These incompatibilities may not be obvious and may lead to defects which are difficult to predict.

Figure 1:
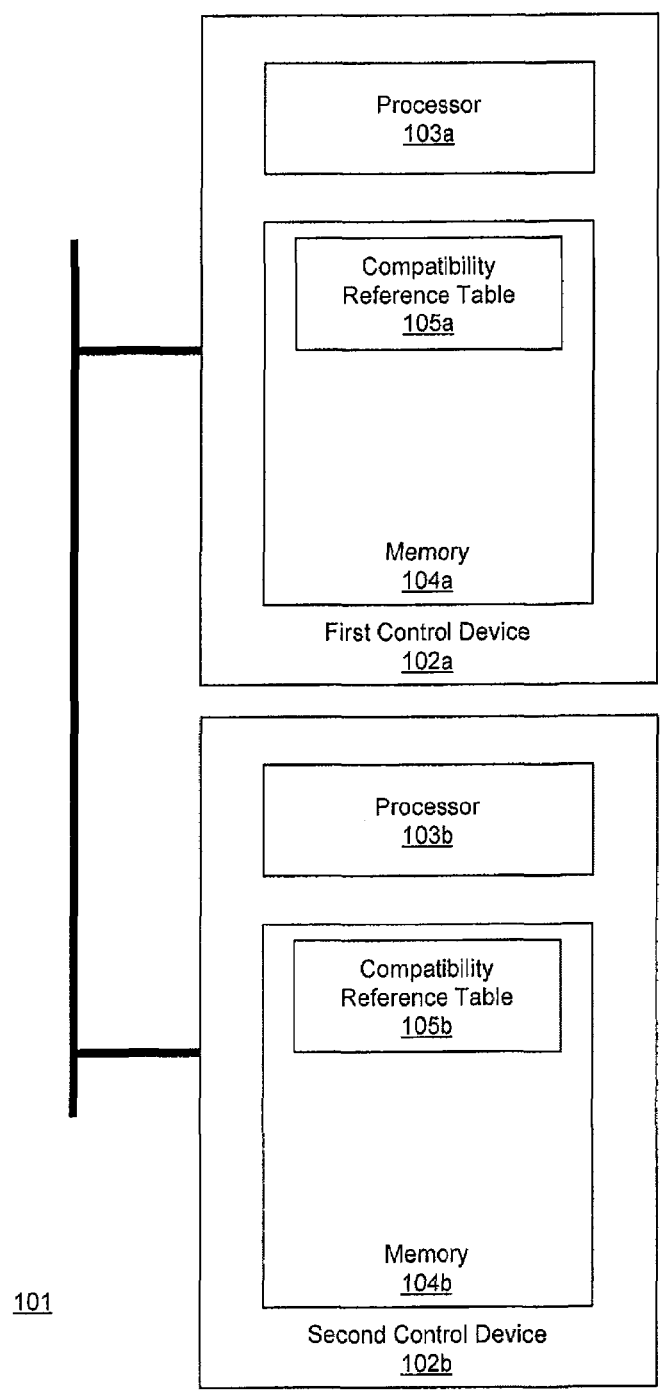
FIG. 1 illustrates an exemplary system according to the invention.

Other objects, advantages and novel features of the present invention will become apparent from the following detailed description of the invention when considered in conjunction with the accompanying drawings.

DETAILED DESCRIPTION

Exemplary embodiments of the present invention provide a method which permits a largely reliable identification of incompatibilities in a bus system that includes several control devices in a motor vehicle. This is achieved by a method of identifying incompatibilities in a bus system of a motor vehicle which has several control devices, the method comprising the acts of: storing control device identification information or an identifier identifying the type of the corresponding control device in a first and in a second control device, the control device identification information or an identifier permits a conclusion on the operating sequences implemented by the corresponding control device and/or on the hardware version of the corresponding control device; storing version information identifying the sequence control of the corresponding control device in the first and in the second control device, the version information permits a conclusion on the operating sequences carried out by the corresponding control device and/or on the current status of the sequence control and/or on hardware version of the corresponding control device; transmitting, by the first control device, its first control device identification information and/or its first version information to the second control device; and accessing, by the second control device, a compatibility reference table which is stored in the second control device, the compatibility reference table indicates which combinations of control device identification information and version information and thus which control devices and their corresponding sequence controls will communicate with the second control device in a compatible manner.

One aspect of the method according to the invention for identifying incompatibilities in a bus system with several control devices includes taking the following process steps.

Storing control device identification information or an identifier identifying the type of the corresponding control device in a first and in a second control device. The control device identification information or the identifier permits a conclusion on the operating sequences implemented by the corresponding control device and/or on the hardware version of the corresponding control device.

In addition, a version information identifying the sequence control of the corresponding control device, particularly a version number, is stored in the first 102a and in the second control device 102b. The version information permits a conclusion on the operating sequences carried out by the corresponding control device and/or on the current status of the sequence control and/or on hardware version of the corresponding control device.

The first control device 102a transmits its first control device identification information and/or its first version information to the second control device 102b.

The second control device 102b accesses a compatibility reference table 105b which can be stored in the second control device. The compatibility reference table indicates which combinations of control device identification information, and version information, and thus which control devices and their corresponding sequence controls will communicate with the second control device in a compatible or tested manner.

According to exemplary embodiments of the present invention, a control device can be a physical control device which has one or more software modules. Each software module carries out at least one function. In other words, each physical control device will then form one or more virtual control devices. In the case of the previously more conventional control devices, each control device carries out only a single function. Thus, there are, for example, separate physical control devices for the engine timing and for the power management of a vehicle. Specifically, a control device of the present invention is a device with at least one data processor 103a, 103b and at least one volatile memory 104a, 104b, the processor or processors implementing the one or more software modules.

In an embodiment of the method according to the present invention, the second control device 102b transmits its control device identification information and its version information to the first control device 102a.

The method of the present invention permits the decentralized identification of incompatibilities when several control devices are used in a communication network or in a bus system of the motor vehicle. Not only is checking of the compatibility carried out between two control devices, but each control device checks the compatibility to the respective other control device. Before a communication connection is established between two control devices, in each case, therefore two independent checks can be carried out concerning the compatibility. This clearly increases the reliability of a bus system which uses the method according to the present invention. Any malfunctioning in areas critical with respect to safety can be avoided. The decentralized solution according to the present invention requires no additional control device. Only the bus load and the memory requirement are slightly increased.

In an exemplary embodiment of the present invention, one control device transmits its control device identification information and its version information to the other control device upon being prompted by the other control device. As a result, it becomes possible to carry out the compatibility check as required and at a suitable point in time, for example, during the "idling" of the querying or prompting control device.

In an exemplary embodiment of the present invention, the first control device transmits its control device identification information and/or its version information in a prompted or unprompted manner to largely all other control devices in the bus system for checking the compatibility.

In an exemplary embodiment of the present invention, the transmission takes place periodically and/or upon a prompting by other control devices and/or at a low bus load and/or before the start of the operation of the motor vehicle.

As a result of the transmission or "broadcasting" of the information to all other control devices, particularly during a low loading of the bus, a fast compatibility check and an identification of incompatible control devices from the plurality of the control devices situated on the bus becomes possible.

In another exemplary embodiment of the present invention, only the version information of the corresponding control device is transmitted if only one logic interface exists between the control devices. This occurs when several control devices or their sequence controls are running on the same hardware.

In an exemplary embodiment of the present invention, each control device compares the control device identification information and/or version information transmitted by one or more other control devices with the compatibility reference table assigned to it or with its entries. The compatibility reference table 105a, 105b can be stored or filed in the memory 104a, 104b of the respective control device 102a, 102b.

In an exemplary embodiment of the present invention, each control device compares the received version information with the entries of the compatibility reference table and communicates (only) when there is conformity with the sending control device in a compatible manner.

The receiving control device therefore determines, using the received control device identification information, whether an entry in the compatibility reference table is present for the sending control device, which compatibility reference table is stored particularly in the receiving control device, and, if applicable, which version information is listed in the entry. In the next step, the received version information is compared with the version information listed in the entry, for the purpose of checking the conformity.

If the received version information does not correspond to the version information listed in the entry because the version information in the form of a version number is greater and/or more up-to-date than the listed version information or the listed version number, one exemplary embodiment of the present invention provides that the receiving control device also communicates with the sending control device if the version number is greater and/or more up-to-date than the version number listed in the compatibility reference table.

In an exemplary embodiment of the present invention, when the comparison is negative, the corresponding receiving control device and/or the corresponding sending control device generates a fault report and/or refuses the service and/or only carries out a restricted operation or an emergency operation.

The invention further permits an advantageous bus system with several control devices which identifies incompatibilities among the control devices in that it carries out a process according to the invention. Likewise, the invention permits a computer program product for identifying incompatibilities in a bus system with several control devices which is arranged in a motor vehicle in that it causes the implementation of a process according to the invention.

Figure 2:
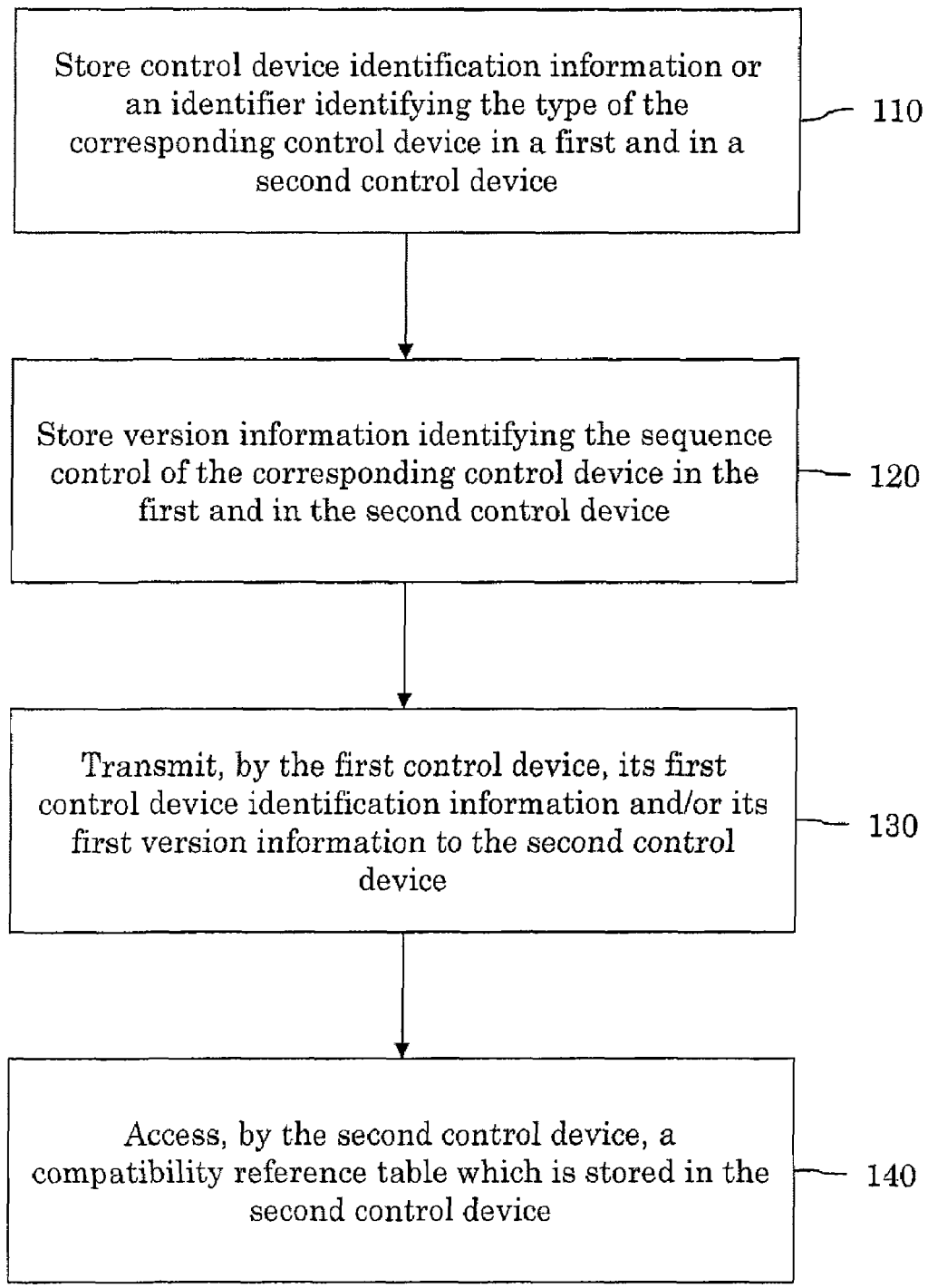
FIG. 2 illustrates an exemplary method according to the invention.

Referring now to FIG. 2, control device identification information or an identifier identifying the type of the corresponding control device is stored in a first and in a second control device (step 110). The control device identification information or an identifier permits a conclusion on the operating sequences implemented by the corresponding control device and/or on the hardware version of the corresponding control device.

Version information identifying the sequence control of the corresponding control device is stored in the first and in the second control device (step 120). The version information permits a conclusion on the operating sequences carried out by the corresponding control device and/or on the current status of the sequence control and/or on hardware version of the corresponding control device.

The first control device transmits its first control device identification information and/or its first version information to the second control device (step 130). The second control device accesses a compatibility reference table which is stored in the second control device (step 140). The compatibility reference table indicates which combinations of control device identification information and version information and thus which control devices and their corresponding sequence controls will communicate with the second control device in a compatible manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of identifying incompatibilities in a bus system of a motor vehicle which has several control devices, the method comprising the acts of:

storing an identifier identifying the type of the corresponding control device in a first and in a second control device, the identifier permits a conclusion on the operating sequences implemented by the corresponding control device and/or on the hardware version of the corresponding control device;

storing version information identifying the sequence control of the corresponding control device in the first and in the second control device, the version information permits a conclusion on the operating sequences carried out by the corresponding control device and/or on the current status of the sequence control and/or on hardware version of the corresponding control device;

transmitting, by the first control device, its identifier and its first version information to the second control device;

accessing, by the second control device, a compatibility reference table which is stored in the second control device, the compatibility reference table indicates which combinations of identifiers and version information and thus which control devices and their corresponding sequence controls will communicate with the second control device in a compatible manner;

transmitting, by the second control device, its identifier and its second version information to the first control device; and accessing, by the first control device, a compatibility reference table which is stored in the first control device, the compatibility reference table indicates which combinations of identifiers and version information and thus which control devices and their corresponding sequence controls will communicate with the first control device in a compatible manner, wherein a communication connection is established between the first and second control devices only when the compatibility reference table in each control device indicates that the first and second control devices can communicate in a compatible manner.

2. The method according to claim 1, wherein the first and second control devices each perform a single vehicle-related function, and the vehicle related function of the first and second control devices is different.

3. The method according to claim 2, further comprising the act of:

transmitting, by the second control device, its second identifier identifying the type of the second control device and its second version information to the first control device.

4. The method according to claim 2, wherein one control device transmits its identifier identifying the type of the corresponding control device and its version information to the other control device upon being prompted by the other control device.

5. The method according to claim 2, wherein the first control device transmits its identifier identifying the type of the corresponding control device and its version information in a prompted or unprompted manner to substantially all other control devices in the bus system for checking the compatibility.

6. The method according to claim 5, wherein the transmission occurs periodically, upon a prompting by other control devices, during time of a low bus load, or before the start of the operation of the motor vehicle.

7. The method according to claim 2, wherein each control device receives the identifier identifying the type of the corresponding control device and version information transmitted by one or more other control devices and compares it with the compatibility reference table assigned to it or with its entries.

8. The method according to claim 7, wherein each control device compares the received version information with the entries of the compatibility reference table and, when there is conformity, communicates with the sending control device in a compatible manner.

9. The method according to claim 8, wherein the version information is a version number, and the receiving control device also communicates with the sending control device if the version number is greater than the version number listed in the compatibility reference table.

10. The method according to claim 7, wherein when the comparison is negative, the corresponding receiving control device and/or the corresponding sending control device generates a fault report and/or refuses the service and/or only carries out a restricted operation or an emergency operation.

11. A bus system having several control devices, which identifies incompatibilities among the control devices, the bus system comprising:

a first and second control device, each arranged to store an identifier identifying the type of the corresponding control device in a compatibility reference table, the identifier permits a conclusion on the operating sequences implemented by the corresponding control device and/or on the hardware version of the corresponding control device;

store version information identifying the sequence control of the corresponding control device in the compatibility reference table, the version information permits a conclusion on the operating sequences carried out by the corresponding control device and/or on the current status of the sequence control and/or on hardware version of the corresponding control device;

transmit its identifier and version information to the other control device; and access the compatibility reference table which is stored in the respective control device, the compatibility reference table indicates which combinations of identifiers and version information and thus which control devices and their corresponding sequence controls will communicate with the control device in a compatible manner, wherein a communication connection is established between the first and second control devices only when the compatibility reference table in each control device indicates that the first and second control devices can communicate in a compatible manner.

12. The bus system according to claim 11, wherein the first and second control devices each perform a single vehicle-related function, and the vehicle related function of the first and second control devices is different.

13. The bus system according to claim 12, wherein the bus system and the first and second control devices are components of a motor vehicle.

14. The bus system according to claim 13, wherein the first control device is an engine timing control device and the second control device is a power management control device.

15. Computer program product for identifying incompatibilities in a bus system having several control devices which is arranged in a motor vehicle, the computer program product, when implemented in a processor, causes the processor to perform the acts of:

storing an identifier identifying the type of the corresponding control device in a second control device, the identifier permits a conclusion on the operating sequences implemented by the corresponding control device and/or on the hardware version of the corresponding control device;

storing version information identifying the sequence control of the corresponding control device in the second control device, the version information permits a conclusion on the operating sequences carried out by the corresponding control device and/or on the current status of the sequence control and/or on hardware version of the corresponding control device;

receiving, by the second control device, an identifier identifying the type of the corresponding control device and version information about a first control device from the first control device;

accessing, by the second control device, a compatibility reference table which is stored in the second control device, the compatibility reference table indicates which combinations of identifiers and version information and thus which control devices and their corresponding sequence controls will communicate with the second control device in a compatible manner;

transmitting, by the second control device, its identifier and its second version information to the first control device; and accessing, by the first control device, a compatibility reference table which is stored in the first control device, the compatibility reference table indicates which combinations of identifiers and version information and thus which control devices and their corresponding sequence controls will communicate with the first control device in a compatible manner, wherein a communication connection is established between the first and second control devices only when the compatibility reference table in each control device indicates that the first and second control devices can communicate in a compatible manner.

16. The computer program product according to claim 15, wherein the first and second control devices each perform a single vehicle-related function, and the vehicle related function of the first and second control devices is different.

17. The computer program product according to claim 16, which when implemented in the processor causes the processor to perform the acts of:

transmitting, by the second control device, its identifier and its second version information to the first control device.

18. The computer program product according to claim 16, wherein the second control device prompts the first control device for the first control device's identifier and its version information.

19. The computer program product according to claim 17, wherein the second control device transmits its identifier and its version information in a prompted or unprompted manner to substantially all other control devices in the bus system for checking the compatibility.

\* \* \* \* \*